United States Patent [19]

Scherrer

[11] 4,092,076

[45] May 30, 1978

[54] ASSEMBLY SYSTEM FOR FRAMES

[76] Inventor: Fernand Scherrer, 4 Rue de la Hardt, Kembs, France, 68680

[21] Appl. No.: 690,270

[22] Filed: May 26, 1976

[30] Foreign Application Priority Data

May 26, 1975 France .................... 75 16283

[51] Int. Cl.² .............................................. F16D 1/00
[52] U.S. Cl. ..................................... 403/178; 403/264
[58] Field of Search ............... 403/264, 362, 256, 178, 403/217, 245; 52/754, 753 D, 753 C; 285/50

[56] References Cited

U.S. PATENT DOCUMENTS

| 2,906,975 | 9/1959 | Donohue et al. ............... 285/48 X |
| 3,580,620 | 5/1971 | Offenbroich .................... 403/264 X |
| 3,612,585 | 10/1971 | Mayr ................................ 403/264 X |
| 3,672,710 | 6/1972 | Kroopp ............................ 403/252 |
| 3,884,002 | 5/1975 | Logie ............................... 312/263 X |

FOREIGN PATENT DOCUMENTS 218,718   12/1961   Austria .................... 403/362

*Primary Examiner*—Wayne L. Shedd
*Attorney, Agent, or Firm*—Darby & Darby

[57] ABSTRACT

An assembly system for mounting lateral beams on a central beam to form a framework in which the central beam is provided with laterally extending, preferably cylindrical pegs, which are formed with inclined bearing surfaces, e.g. conical surfaces, adjacent their free ends. The lateral beams have bores formed therein into which the pegs fit, and transversely extending screws having conical ends are screwed against the inclined bearing surfaces to press the lateral beams against the central beam.

11 Claims, 6 Drawing Figures

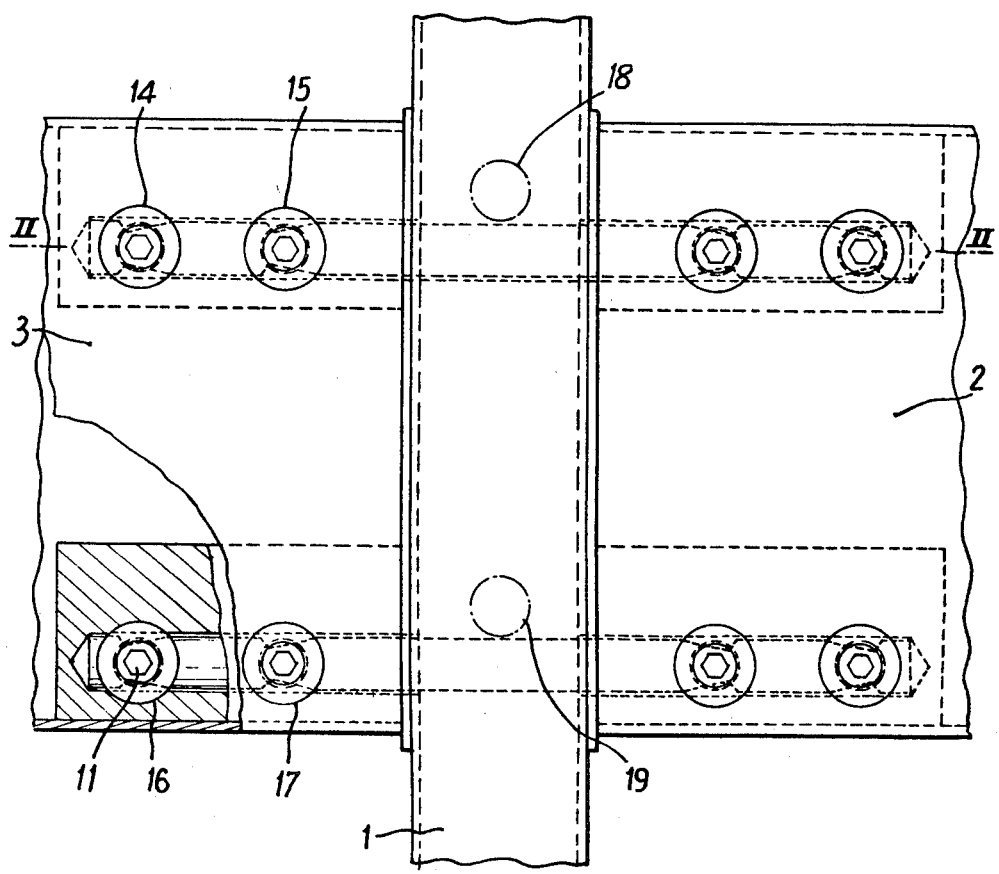
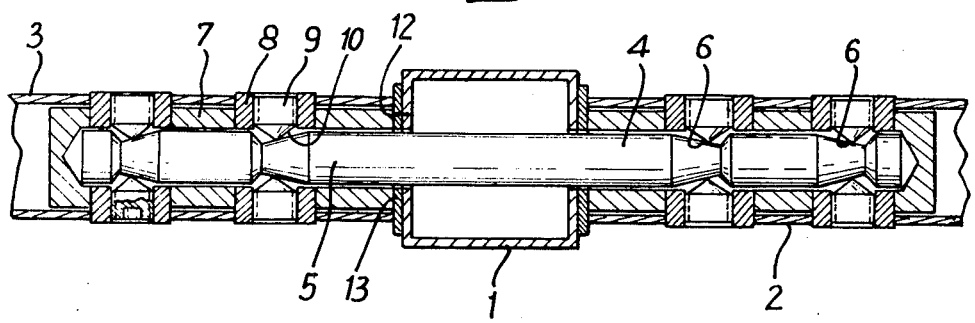

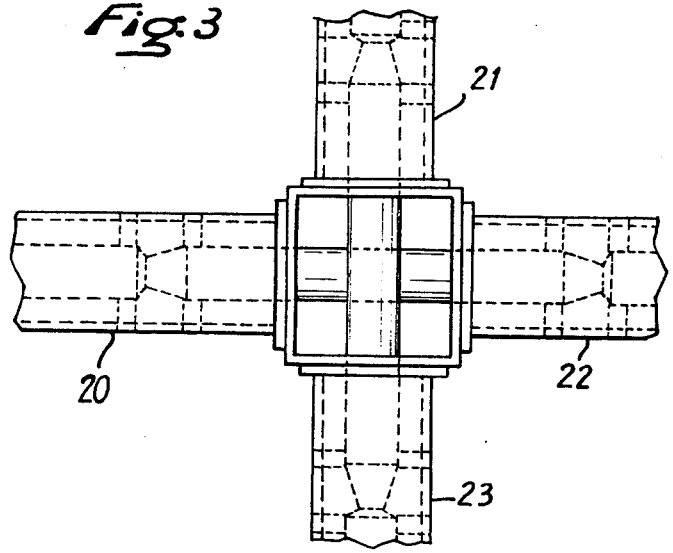
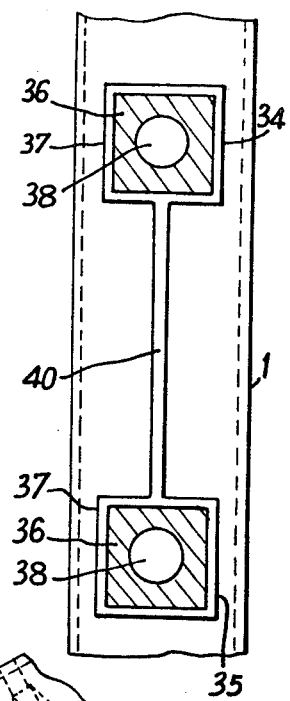
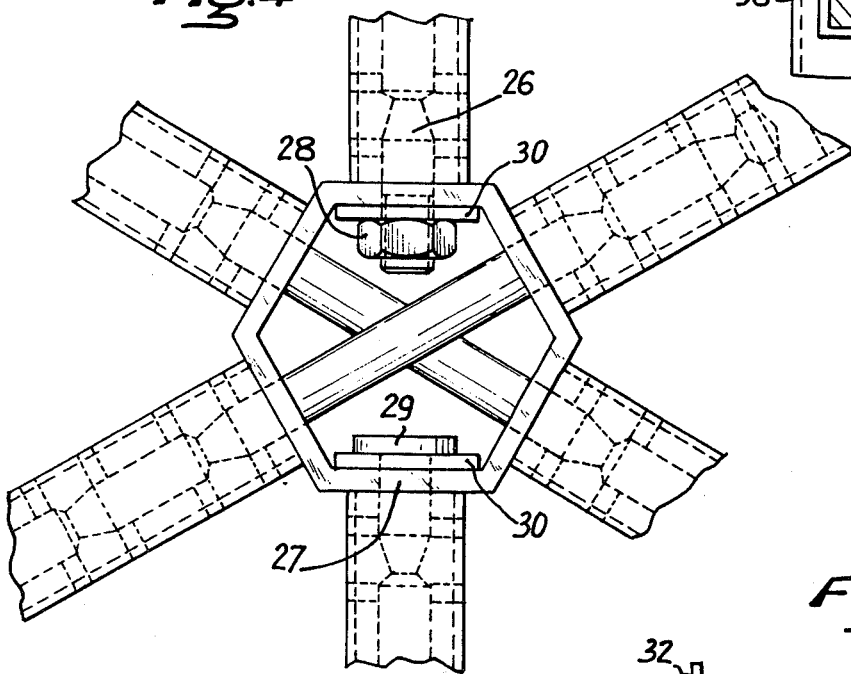
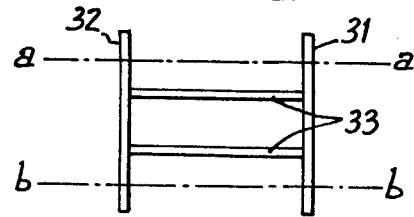

ASSEMBLY SYSTEM FOR FRAMES

The present invention relates to an assembly system for frames and particularly building frames.

According to the present invention, there is provided an assembly system for mounting lateral beams on a central beam, such system comprising a central beam provided with laterally extending pegs provided with bearing surfaces inclined with respect to their axis tapered away from the central beam, lateral beams having bores of a size to receive the pegs, and transverse screws having conical ends which are positioned to engage the inclined bearing surfaces of the lateral pegs to ensure accurate insertion and clamping of the end of the lateral beam against the associated lateral wall of the central beam.

Such a system may be applied in particular, although not exclusively, to frameworks formed by means of metallic profiles, notably of aluminium. It allows in certain cases the manufacture in a factory of pieces ready to be mounted, of reduction of the cost of transport and of ease of manipulation on the site. The frameworks thus formed lend themselves, in particular, to the production of light structures, dwelling houses, offices, schools etc.

In order that the invention may more readily be understood, the following description is given, merely by way of example, reference being made to the accompanying drawings, in which:

FIG. 1 is a side elevational view of one embodiment of assembly system according to the invention;

FIG. 2 is a horizontal section taken along the line II—II of FIG. 1;

FIG. 3 is a schematic plan view of an assembly of four lateral beams on a central beam;

FIG. 4 is a similar view of a variant comprising six lateral beams;

FIG. 5 is a schematic view showing the mounting on a central beam of non-tubular form; and FIG. 6 is a schematic view relating to an assembly of beams having a section other than rectangular.

In the examples shown in FIGS. 1 and 2, the framework can comprise a mounting or central beam 1, on which, on each side, are fixed two lateral beams 2 and 3. The beams are here constituted by a metallic profile, the central beam, for example, being of square section and the lateral beams of rectangular section.

Passing through the central beam 1 are pegs 4, 5 on which are mounted the lateral beams 2 and 3. The pegs 4, 5 are formed in this embodiment by a cylindrical bar, having inclined conical bearing surfaces 6, of which the larger end is tapered towards the central beam 1.

In the lateral beams 2, 3 of which the section is rectangular, are disposed metallic sleeves 7, which are positioned in the beams by tubes 8 disposed at the locations which correspond to the oblique bearing surfaces 6 of the pegs 4, 5. The tubes 8 are threaded interiorly and receive fixing screws 9, of which the end 10 is conical. The screws 9 comprise an interior non-circular socket 11, which is square or hexagonal, for example, in which one can introduce a key to effect their clamping on the conical parts of the pegs. The inclination of the conical parts of the pegs and of the screws are chosen in a manner that the clamping of the screws has the effect of pressing the end of the particular beam, such as 2 or 3, against the vertical face 12 of the central beam 1.

In the embodiment shown, the peg 14 is of circular section, the bearing surfaces 6 being conical. However, they could have another section, square for example, the bearing surfaces 6 being formed in a similar manner with an oblique surface having the same function of clamping of the lateral beam against the central beam.

The pegs and sleeves can be formed in any appropriate manner, for example of metal or a plastic material, having sufficient mechanical properties.

The lateral beam is pressed against the central beam 1 through the intermediary of a packing 13 of an insulating material, for example a plastics material, which ensures a thermal barrier and a good distribution of pressure between the two beams.

To mount the assembly, one initially proceeds separately to put into place the pegs 4, 5 in the central beam 1, and the sleeves 7, the tubes 8 and screws 9 in the lateral beams. The latter being prepared, it is sufficient to force the ends of the pegs into the lateral beam, and to screw in the screws 9. Being given the obliquity of the bearing surfaces 6 and 10, the lateral beams are forced rigidly in position tightly clamping on the central beam 1.

According to the needs of a particular application, one provides for each lateral beam a plurality of clamping devices with oblique bearing surfaces and screws. It can be seen that in a majority of cases, one obtains a satisfactory locking and provides for each side beam, as is shown in FIG. 1, two clamping elements 14 and 15 in the upper zone and two more 16 and 17 in the lower zone. Such an arrangement gives good rigidity of the assembly.

The embodiment represented in FIGS. 1 and 2 concerns the assembly on the central beam of two lateral beams only. The invention can also be applied to more complex assemblies. Such an assembly having four lateral beams 20, 21, 22, 23 is shown in FIG. 3. In such a case, one can, in the same manner as in the arrangement of FIGS. 1 and 2, utilize double pegs each engaging two opposed beams; it suffices then to offset in height the double pegs 18 and 19 associated with the beams 21 and 22 with respect to those associated with the beams 22 and 24; thus, the pegs 18 and 19 can occupy the positions illustrated in discontinuous line, by way of example, in FIG. 1.

In FIG. 4 there has been shown schematically an assembly of six lateral beams on a central beam 25 having a hexagonal section. For four of the lateral beams, there are provided double pegs, offset as stated above in connection with FIG. 3. For the other two, there are provided simple pegs such as 26 or 27. The fixing of the latter on the central beam can be done in diverse manners, for example by means of a nut 28 screwed on an interior thread provided to this effect on the interior end of the peg, with a washer 30 interposed, or by means of a head 28 fixed to the body of the peg, the hole for the peg in the wall of the central beam being provided in a form or dimension allowing the peg to be put in place from the interior.

The simple pegs of this kind can be utilized in all cases; however, it is preferable to utilize double pegs in all cases where it is possible, because this simplifies the assembly and enables a great rapidity of mounting.

In the examples shown in the drawings, the central beam is tubular. The invention can be applied to any case where the beams designated above by the expression "lateral beams" are assembled on an element capable of receiving pegs with a view to fixing on a vertical wall.

Thus, the fixtures of this type can be made on wings 31, 32 (FIG. 5) of a central beam 33, by means of pegs disposed according to the lines *aa* and *bb*. Moreover, the lateral beams can have a section other than rectangular, provided only that they are of a nature to receive sleeves having the same function as the sleeves 7 of FIG. 1. This is so in FIG. 6, the lateral beam mounted on the central beam 1 is formed of two tubular parts 37 joined by a core 40, each of the tubular parts receiving a tube 36 into which extend a peg 38.

It should be, moreover, indicated that the invention can be applied to wooden beams. In this case, the sleeves are replaced by the wood of the beam, in which are drilled the necessary bores, the pegs, the tubes and clamping screws remaining constituted and disposed as has been indicated above.

I claim:

1. An assembly system for mounting a first beam to a central beam of polygonal cross-section comprising:

a said first beam extending from said central beam and to be connected thereto with the end of the first beam to be supported by a plane face of said central beam, a peg extending from a face of said central beam, the extending portion of said peg having a conical tapered bearing surface extending around the periphery of the peg, an axial bore extending to an end of said first beam for receiving the extending portion of said peg having the bearing surface thereon, peg engaging means comprising:

(a) a pair of bores formed through the surface of said first beam transverse to its longitudinal axis and extending into the area of said bore to be occupied by the tapered bearing surface of said peg, said bores of said pair being substantially diametrically opposed, (b) tube means mounted on said first beam and extending into each of said bores of said pair of bores, said tube means having means for receiving a screw, (c) and a screw having a conical end in a respective screw receiving means of a corresponding tube means, said concial end of each said screw engaging the tapered bearing surface of said peg to draw the end of said lateral beam into which the peg extends toward the corresponding face of said central beam to be supported thereby as the screws are tightened.

2. An assembly system as in claim 1 further comprising a second beam with an axial bore opposing said first beam and extending along a common line with said first beam said peg having an extension passing through the central beam and having a second extending portion with a conical tapered bearing surface extending into the axial bore of said second beam, and peg engaging means for said second beam for drawing the respective end of each of said second beam toward the central beam as the screws of the peg engaging means of said second beam are tightened.

3. An assembly system as in claim 1 wherein said first beam is provided with axial bores for receiving two said pegs extending from said central beam offset at different levels with respect to one another and peg engaging means for each of said pegs.

4. An assembly system as in claim 1, wherein the beams are metallic.

5. An assembly system as in claim 4 further comprising a thermally insulating plate interposed between the first beam and the central beam.

6. An assembly system as in claim 1 wherein said first beam is hollow and further comprising mounted interiorly of the hollow first beam a sleeve for said peg formed with a bore having a corresponding shape to that of the peg, each said screw of said peg engaging means passing through said sleeve to engage the bearing surface of the peg.

7. An assembly system as in claim 1 further comprising means for attaching said peg to the wall of the central beam on which the peg is mounted.

8. An assembly system as in claim 2 wherein the central beam is of polygonal cross-section and wherein said first and second beams are attached to directly opposing sides of said polygonal cross-section of said central beam.

9. An assembly system as in claim 8 wherein there are two pairs of said first and second beams, the said first and second beams of a respective pair extending from opposing faces of said polygonal cross-section of said central beam, the peg for each pair of lateral beams being at a different level.

10. An assembly system as in claim 1 wherein the extending portion of said peg is formed with a second conical bearing surface spaced along the length of the peg from the first named bearing surface and peg engaging means for said second bearing surface.

11. An assembly as in claim 1 wherein the apex of the conical bearing surface faces toward said central beam.

* * * * *